US012586468B2

(12) United States Patent
Micus et al.

(10) Patent No.: US 12,586,468 B2
(45) Date of Patent: Mar. 24, 2026

(54) METHOD FOR PROVIDING THE CURRENT CAPACITY UTILIZATION OF PARKING SPACES ALONG A ROAD TO A VEHICLE, COMPUTER-READABLE MEDIUM, SYSTEM, AND VEHICLE

(71) Applicant: Bayerische Motoren Werke Aktiengesellschaft, Munich (DE)

(72) Inventors: Christian Micus, Unterhaching (DE); Jasper Smeets, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1 day.

(21) Appl. No.: 18/715,559

(22) PCT Filed: Sep. 21, 2022

(86) PCT No.: PCT/EP2022/076151
§ 371 (c)(1),
(2) Date: May 31, 2024

(87) PCT Pub. No.: WO2023/110179
PCT Pub. Date: Jun. 22, 2023

(65) Prior Publication Data
US 2025/0029493 A1     Jan. 23, 2025

(30) Foreign Application Priority Data
Dec. 14, 2021    (DE) .................... 10 2021 133 080.7

(51) Int. Cl.
*G08G 1/14*          (2006.01)
*G06F 18/2321*     (2023.01)
*G06F 18/24*        (2023.01)

(52) U.S. Cl.
CPC ......... *G08G 1/143* (2013.01); *G06F 18/2321* (2023.01); *G08G 1/147* (2013.01)

(58) Field of Classification Search
CPC ........ G08G 1/147; G08G 1/143; G08G 1/141; G06F 18/2321
See application file for complete search history.

(56) References Cited

U.S. PATENT DOCUMENTS 9,558,664 B1 *   1/2017   Gaebler ................. G08G 1/144
12,067,878 B1 *   8/2024   Campbell .............. G06Q 40/08
(Continued)

FOREIGN PATENT DOCUMENTS

DE        102010031351 A1      1/2012
DE        102021200115 A1      7/2022
(Continued)

OTHER PUBLICATIONS

International Search Report corresponding to International Patent Application No. PCT/EP2022/076151, dated Jan. 4, 2023 (5 pages).
(Continued)

*Primary Examiner* — Davetta W Goins
(74) *Attorney, Agent, or Firm* — Maginot, Moore & Beck LLP

(57)          ABSTRACT

A method for providing a current capacity utilization of parking spaces along a road to a vehicle includes receiving a parking position of vehicles of a vehicle fleet, determining a number of roads within a given radius around the parking positions, and determining a road for each vehicle that has the shortest distance between the parking position of the vehicle and the position of the road. The method further includes classifying the parking position for each vehicle depending on the distance of the parking position of the respective vehicle from the given road, and determining a parking space type for each vehicle depending on the classified parking position as an off-road parking space or a parking space along the road. The method also includes calculating a current capacity utilization of the parking (Continued)

spaces along the road, and providing the current capacity utilization of the parking spaces along the road.

17 Claims, 2 Drawing Sheets

(56)                    References Cited

U.S. PATENT DOCUMENTS

| | | |
|---|---|---|
| 2014/0266800 A1 | 9/2014 | Koukoumidis et al. |
| 2018/0053417 A1* | 2/2018 | Rolf ................... G01C 21/3685 |
| 2020/0201355 A1* | 6/2020 | Colijn ................... G08G 1/143 |

FOREIGN PATENT DOCUMENTS

| | | | |
|---|---|---|---|
| EP | 3739297 A1 | 11/2020 |
| WO | 2010081545 A1 | 7/2010 |
| WO | 2011138035 A1 | 11/2011 |

OTHER PUBLICATIONS

Written Opinion corresponding to International Patent Application No. PCT/EP2022/076151, dated Jan. 4, 2023 (7 pages).
German Search Report corresponding to German Patent Application No. 10 2021 133 080.7, dated Aug. 18, 2022. (5 pages).

* cited by examiner

100

METHOD FOR PROVIDING THE CURRENT CAPACITY UTILIZATION OF PARKING SPACES ALONG A ROAD TO A VEHICLE, COMPUTER-READABLE MEDIUM, SYSTEM, AND VEHICLE

CROSS-REFERENCE TO RELATED APPLICATIONS

This application is the U.S. national phase of PCT Application PCT/EP2022/076151 filed on Sep. 21, 2022, which claims priority of German patent application No. 102021133080.7 filed on Dec. 14, 2021, the entire contents of which are incorporated herein by reference.

FIELD

The disclosure relates to the field of motor vehicles, and particularly to a method and system for providing a current capacity utilization of parking spaces along a road to a vehicle.

BACKGROUND

A search for a parking space for a vehicle in cities can account for up to a third of inner-city traffic. When looking for a parking space, a distance of up to 4.5 km can be covered and take an average of 4 minutes. For example, systems that display capacity utilization information about parking spaces in a navigation system are known from the prior art.

SUMMARY

In view of the foregoing, it would therefore be desirable to provide a capacity utilization of parking spaces along a road more efficiently. In particular, it would be desirable to provide a current capacity utilization of parking spaces along a road to a vehicle more efficiently. Furthermore, it would be desirable to determine and/or provide a current capacity utilization of parking spaces in a geographical area more efficiently.

According to a first aspect of the disclosure, a method is disclosed for providing a current capacity utilization of parking spaces along a road to a vehicle. The method can be a computer implemented method and/or a control unit implemented method. The vehicle can be a motor vehicle or a motorcycle. The road may comprise one or more road segments. The current capacity utilization can be provided for one or more road segments of the road.

Parking spaces along the road may include parking spaces perpendicular to the road and/or parking spaces in the longitudinal direction of the road. The current capacity utilization can be a capacity utilization at the current time. In addition, the current capacity utilization can include a forecasted capacity utilization at a future time, such as an estimated time of arrival at the destination. The method includes receiving a parking position for a plurality of vehicles of a vehicle fleet. The vehicle fleet can include a plurality of vehicles from one or more vehicle manufacturers. In addition or alternatively, the vehicle fleet may include a plurality of vehicles in a geographical area. The parking position can be a position of a satellite-based positioning system, such as a GPS position. In addition or alternatively, the parking position can be determined by a cellular-based, WLAN-based, and/or UWB-based positioning system.

The method further includes determining a number of roads within a given radius around the parking position for each received parking position of a vehicle of the plurality of vehicles, and determining a road from the number of roads for each vehicle of the plurality of vehicles that has a shortest distance between the parking position of the vehicle and the position of the road. Alternatively, the road can be a road segment. Furthermore, the method includes classifying the parking position for each vehicle of the plurality of vehicles as a parking space off the road or as a parking space along the road depending on the distance of the parking position of the respective vehicle from the plurality of vehicles from the specified road, and determining a parking space type for each vehicle from the plurality of vehicles depending on the classified parking position. The method calculates a current capacity utilization of the parking spaces along the road, and provides the current capacity utilization of the parking spaces along the road to the vehicle.

Advantageously, the method can precisely determine the capacity utilization of parking spaces along the road and provide a current capacity utilization to the vehicle. This makes it easier for the driver of a vehicle to find a parking space along the road. Furthermore, the method can determine the parking space along the road depending on the distance of the respective vehicle from the specified road. This calculation leads to a reliability of the method for determining the parking spaces along the road. The parking spaces along the road can be determined correctly with an accuracy of at least 95.4%. Thus, the method can provide the vehicle with more accurate, up-to-date capacity utilization data about parking spaces along the road. Furthermore, the method can determine an exact capacity utilization using the parking position of vehicles of the vehicle fleet. The parking position can result, for example, from a transmission of a last state of the vehicle to an external server, so that vehicle-specific changes are not necessary to carry out the method and calculate precise capacity utilization data of parking spaces along the road.

According to an advantageous embodiment of the disclosure, the current capacity utilization can be a relative capacity utilization of the parking spaces along the road.

According to another, advantageous embodiment the number of roads can include road segments of roads within a predetermined radius around the parking position.

According to another, advantageous embodiment of the disclosure, the classification of the parking position for each vehicle can be carried out by means of a classification algorithm, and/or the classification algorithm can classify the parking position for each vehicle in one of two clusters, and/or a first cluster can be representative of off-road parking spaces and a second cluster of the two clusters can be representative of parking spaces along the road. This can be used to efficiently determine parking spaces along the road.

According to another advantageous embodiment of the disclosure, the classification algorithm can use a Gaussian Mixture Model. This can be used to efficiently classify parking spaces along the road.

According to another, advantageous embodiment of the disclosure, the first cluster and the second cluster may be separated using a separation point, and/or the separation point may be representative of a distance at which a separation is made between the two clusters, and/or the separation point may be an intersection of two Gaussian density distributions depending on the distance of the parking position of all vehicles of the plurality of vehicles from the respective specified road. This can be used to efficiently classify parking spaces along the road.

According to a further, advantageous embodiment of the disclosure, the current capacity utilization of the parking spaces along the road can be provided in a navigation map to a user of the vehicle, and/or the current capacity utilization of the parking spaces along the road can be provided in a navigation map of the vehicle depending on a navigation destination of the vehicle. This allows the user of the vehicle to efficiently use the current capacity utilization of the parking spaces along the road to search for parking spaces at the destination.

According to another aspect, the disclosure is characterized by a computer-readable medium for providing a current capacity utilization of parking spaces along the road to a vehicle, wherein the computer-readable medium contains instructions which, when executed on a computer, carry out the method described above. Computers capable of carrying out the method include controllers which are commonly used in vehicles to control one or more vehicle operations. Controllers (which may also be referred to herein as "control units," "processors" or "microprocessors") include circuits (e.g., integrated circuits) that contain typical functionality of central processing units (CPU) and are configured to perform various calculations and analysis based on manufacturer programming and/or circuit components. Examples of controllers used in vehicles include any of various Engine Control Units (ECNs) and other controllers commonly used by different manufacturers in modern automobiles.

According to another aspect, the disclosure is characterized by a system for providing a current capacity utilization of parking spaces along the road to a vehicle, wherein the system is designed to carry out the method described above.

According to another aspect, the disclosure is characterized by a vehicle containing the system described above for providing a current capacity utilization of parking spaces along the road to the vehicle.

Further features of the disclosure are evident from the claims, the figures and the description of the figures. All the features and combinations of features mentioned above in the description as well as the features and combinations of features mentioned below in the description of figures and/or shown in the figures alone can be used not only in the respective specified combination, but also in other combinations or on their own.

BRIEF DESCRIPTION OF THE DRAWINGS

In the following, a preferred exemplary embodiment of the disclosure is described on the basis of the attached drawings. This results in further details, preferred designs and developments of the disclosure. In the figures.

DESCRIPTION

Figure 1:
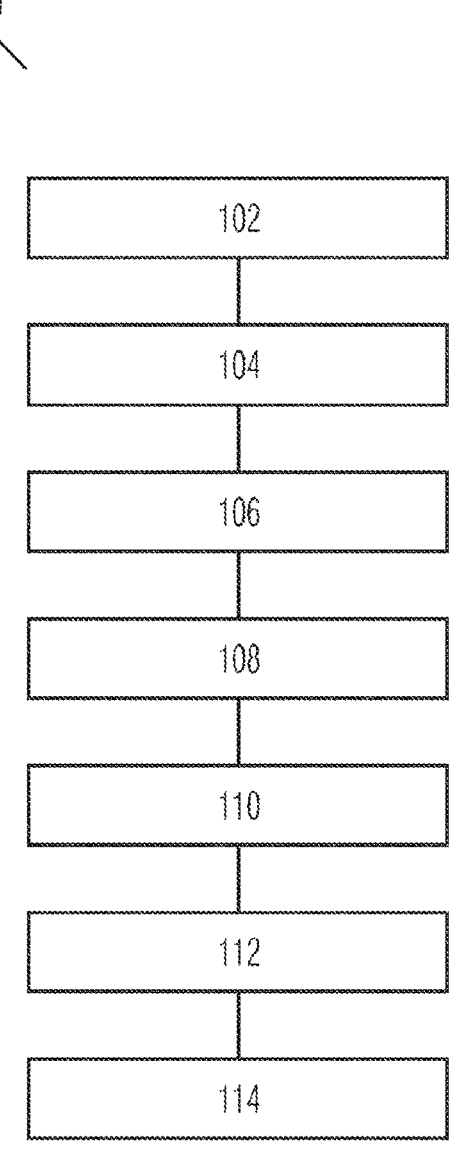
FIG. 1 shows in detail and schematically an exemplary method for providing a current capacity utilization of parking spaces along a road to a vehicle.

In detail, FIG. 1 shows an exemplary method 100 for providing a current capacity utilization of parking spaces along a road to a vehicle. The current capacity utilization can be a forecasted capacity utilization of parking spaces along the road. If the current capacity utilization at a time or period is known, the method can be used to recommend roads or road segments to a user that are within a radius of a navigation destination of the user of the vehicle and for which a low capacity utilization has been calculated.

The method 100 can receive 102 a parking position of a plurality of vehicles of a vehicle fleet. The method 100 can receive the parking position of a vehicle of the plurality of vehicles from the vehicle via an external server. Furthermore, the method 100 can analyze a parking position of the vehicle transmitted by the vehicle to an external server when a vehicle is parked. Preferably, the parking position received from the server that is external to the vehicle is a GPS position of the vehicle. For example, the vehicle can transmit messages to the server external to the vehicle by means of a last-state call signal when the vehicle is parked and/or when a vehicle drive has been switched off. The messages transmitted from the vehicle to the server external to the vehicle with the last-state call signal may include an exact position of the vehicle, a time, a vehicle type, a type of drive and/or a direction in which the vehicle is parked. The exact position of the vehicle can be the parking position of the vehicle. For example, the exact position of the vehicle can be the GPS position of the vehicle.

The method 100 can determine 104 a number of roads within a given radius around the parking position for each received parking position of a vehicle of the plurality of vehicles. The number of roads may contain one or more roads and/or one or more road segments. The given radius can be fixed, for example 10, 20, . . . , 50, 60, 70, . . . , 100, 200, 300, 400, . . . m around the parking position of the vehicle. Alternatively, the given radius can be determined dynamically depending on available computing power and/or available bandwidth to determine the number of roads. The larger the radius, the greater the number of roads that must be determined and processed in the subsequent steps of the method. A smaller radius, for example a radius of 50 m, allows for faster processing of the determined number of roads. In detail, the method 100 for determining the number of roads can use a well-known map matching method to compare the received parking position with location information on the digital map. The received parking position, such as a GPS position of the vehicle, may have measurement errors. The map matching method can determine the most likely position of the vehicle in the digital map for the received parking position of the vehicle. This makes it possible to reduce possible measurement errors in the received parking position and to determine the number of roads in the vicinity of the vehicle's parking position more accurately.

Furthermore, the method can determine 106 a road from the number of roads for each vehicle of the plurality of vehicles which has the shortest distance between the parking position of the vehicle and the position of the road. The shortest distance can be determined by means of a well-known neighborhood search method using a digital map, in particular a digital navigation map.

The method 100 can classify 108 the parking position for each vehicle of the plurality of vehicles depending on the distance of the parking position of the respective vehicle of the plurality of vehicles from the specified road. The classification 108 of the parking position of the vehicle can be carried out by means of two clusters. The first cluster is preferably representative of parking spaces along the road and the second cluster is preferably representative of off-road parking spaces on private land. In addition, the parking position of the vehicle can be classified into one of the two clusters depending on the distance of the parking position of the vehicle from the road. The distance used as a separation point for classifying into one of the two clusters may depend on a geographic area for which the parking locations were received. For example, a decision value of 9.5 m can be set in large German cities. If the distance of the parking position of the vehicle from the determined is less than 9.5 m, the parking position can be assigned to the first cluster. If the distance of the parking position of the vehicle from the specified road is greater than or equal to 9.5 m, the parking position can be assigned to the second cluster. In Munich, a separation point of 9.33 m, in Berlin a decision value of 9.73 m, in Frankfurt a separation point of 9.21 m, and in Stuttgart a separation point of 9.58 m can be set. The separation point can be set for a geographical area depending on historical parking processes and their analysis.

In detail, a cluster classification algorithm can be used to classify the parking position of the vehicle or all received parking positions of vehicles. For example, the cluster classification method based on a Gaussian mixture model (GMM) can be used. A GMM consisting of K Gaussian component densities can be described as follows:

$$P(x) = \sum_{k=1}^{K} w_k * \mathcal{N}(x \mid \mu_k, \Sigma_k), \tag{1}$$

wherein $w_k$ is the linear weight of the individual Gaussian distributions, N is a single n-dimensional Gaussian component distribution with a corresponding n-dimensional expected value vector $\mu_k$, and an n×n covariance matrix $\Sigma_k$. The n-dimensional Gaussian distribution can be described as follows:

$$\mathcal{N}(x \mid \mu_k, \Sigma_k) = \frac{1}{(2*\pi)^{\frac{n}{2}} * \sqrt{|\Sigma_k|}} * e^{\left\{-\frac{(x-\mu_k)^T * \Sigma_k^{-1} * (x-\mu_k)}{2}\right\}}. \tag{2}$$

wherein $/\Sigma_k/$ represents the determinant of the covariance vector corresponding to the kth Gaussian in the GMM. In the case of a one-dimensional Gaussian distribution, (2) we can simplify as follows:

$$\mathcal{N}(x \mid \mu_k, \sigma_k^2) = \frac{1}{\sqrt{2*\pi*\sigma_k^2}} * e^{\left\{\frac{(x-\mu_k)^2}{2*\sigma_k^2}\right\}}, \tag{3}$$

where $\sigma_k^2$ and $\mu_k$ correspond to the variance and the expected value of the kth Gaussian distribution.

The complete GMM with k Gaussian component densities can be described with the following parameter matrix:

$$\theta = \begin{bmatrix} w_1 & \mu_1 & \sigma_1^2 \\ & \vdots & \\ w_K & \mu_K & \sigma_k^2 \end{bmatrix}. \tag{4}$$

When the medal is adjusted, the parameters can be determined in such a way that the parameters maximize a log-likelihood function of the model. For a given J-dimensional observation vector X, X=[$x_1$, . . . , $x_1$], the log-likelihood function can be described as follows:

$$\ln(P(X \mid \theta)) = \sum_{j=1}^{J} \ln\left\{\sum_{k=1}^{K} w_k * \mathcal{N}(x_j \mid \mu_k, \sigma_k^2)\right\}. \tag{5}$$

Maximizing the log-likelihood function can be carried out by a well-known expectation maximization algorithm that iteratively estimates the optimal values of the parameters $w_k$, $\mu_k$, and $\sigma_k^2$ to maximize the log-likelihood function of the GMM.

In order to improve the performance of the cluster classification algorithm and to reduce or avoid so-called underfitting and/or so-called overfitting, an optimal number of clusters can be determined. For example, the optimal number of clusters can be determined analytically using the Akaike Information Criterion (AIC) and the Bayesian Information Criterion (BIC), which indicate a relative quality of a statistical model. Both parameters have a minimum value at exactly two 2 clusters, so the cluster classification algorithm with exactly two clusters reduces underfitting and overfitting and allows for more precise results when classifying the parking positions.

Figure 2:
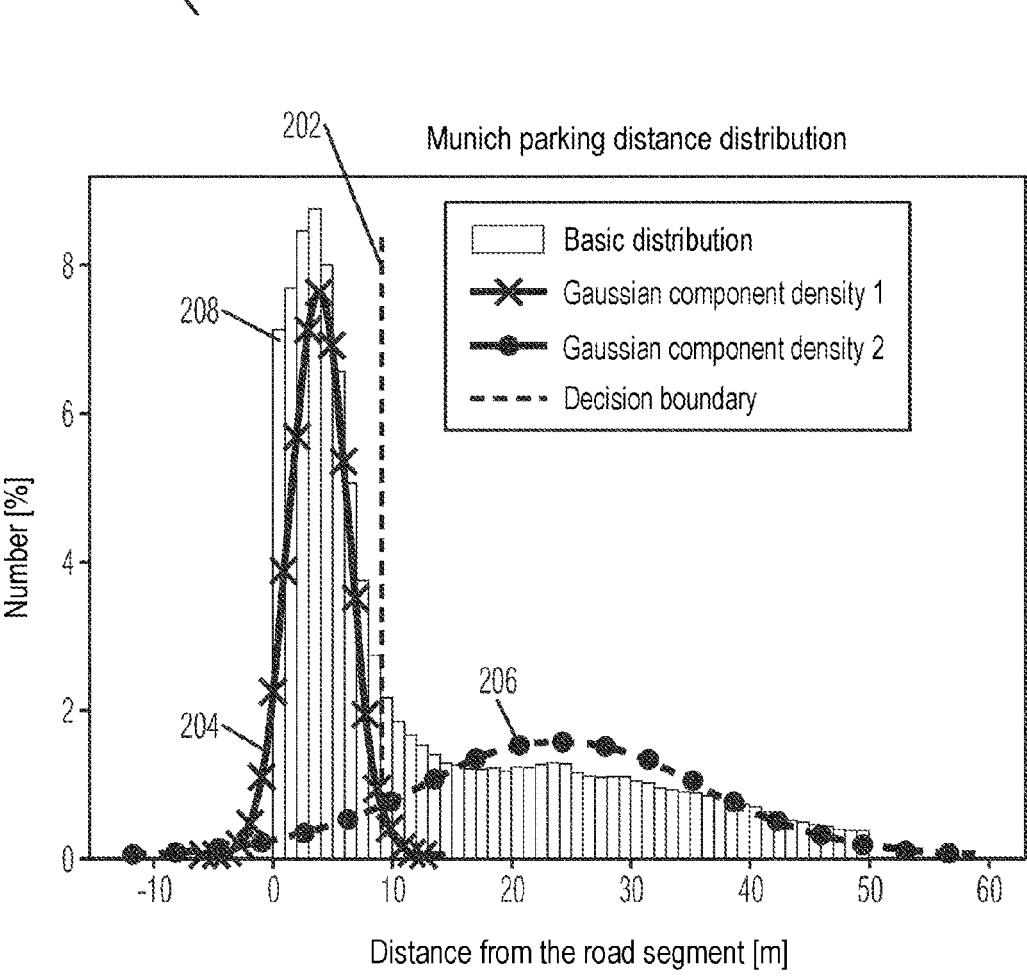
FIG. 2 shows in detail and schematically an example of classifying the parking position of a vehicle.

To determine the separation point between the two clusters, the classification of parking positions to a cluster of the two clusters can be carried out by a probability-based assignment of each parking position to one cluster of the two clusters. The separation point between two clusters can be defined as an intersection between two Gaussian component densities. FIG. 2 shows an example 200 for classifying the parking position of a vehicle. In detail, an intersection 202 between two Gaussian component densities 204 and 206 can be determined as a separation point for a distribution 208 of the distances of the parking positions of vehicles from a road or a road segment.

The method 100 can determine 108 a parking space type for each vehicle from the plurality of vehicles depending on the classified parking position as a parking space off-road or as a parking space along the road. The first cluster includes the parking positions of vehicles parked in parking spaces along the road. In the following steps of the method, this cluster serves as the basis for calculating the capacity utilization of the parking spaces along the road and for providing this capacity utilization to the vehicle.

The method 100 can calculate 110 a current capacity utilization of the parking spaces along the road. For the purpose of calculating the current capacity utilization, the method may take into account the classified parking positions for which the parking space type determines the parking space along the road. These parking spaces are in the first cluster. The current capacity utilization of the parking spaces along the road can be calculated for each road or road section depending on a point in time and/or a period of time. In addition or alternatively, weather conditions and/or a historical capacity utilization can be included in the calculation of the current capacity utilization. The calculation of the current capacity utilization can be made live. This means that for each parking position received by a vehicle, an update of the current capacity utilization can be calculated in order to be able to quickly provide changes to the vehicle. The current capacity utilization is preferably representative of a number of parking operations along the road for a road and/or a road segment. The maximum value for calculated parking operations for a road and/or a road segment can be set as a maximum number of parking spaces on a road or road segment. The current capacity utilization can be calculated relative to the maximum number of parking spaces. Furthermore, the current utilization can include a forecasted capacity utilization at future times and/or time intervals. For this purpose, the current capacity utilization at a current time can be combined with historical capacity utilizations at historical times, time intervals, weather data, and/or events.

The method 100 can provide 114 the current capacity utilization of the parking spaces along the road to the vehicle. The current capacity utilization of the parking spaces can be displayed visually, for example as a heat map, on a digital navigation map, for example, on a vehicle display or other display, such as a smartphone. In addition or alternatively, the current capacity utilization of the parking spaces along the road can be provided to a navigation system of the vehicle. The navigation system of the vehicle may, using the current capacity utilization at a destination or a current location of the vehicle, provide suggestions to a user of the vehicle regarding in which roads or road segments the current capacity utilization of the parking spaces along the road is low. Furthermore, the current capacity utilization of the parking spaces along the road can be provided to a driver assistance system, which guides the vehicle to a road and/or a road segment in a partially, highly and/or fully automated manner and/or performs a parking maneuver when a free parking space along the road is detected.

Advantageously, the user can be efficiently assisted in finding a parking space along the road. By determining parking spaces along the road against the distance of the parking position of the vehicle from the closest road or road segment, parking spaces along the road can be determined more accurately. The current capacity utilization of parking spaces can thus be provided to the vehicle more precisely. Traffic during a search can be efficiently reduced by presenting to the user of the vehicle more precise instructions for looking for parking spaces along the road.

REFERENCE SIGN LIST

100 Method
102 Receiving a parking position
104 Determining a number of roads
106 Determining a road from the number of roads
108 Classifying the parking position
110 Determining a parking space type
112 Calculating a current capacity utilization
114 Providing the current capacity utilization
200 Example
202 Separating point
204 Gaussian component density
206 Gaussian component density
208 Distribution

The invention claimed is:

1. A method for providing a current capacity utilization of parking spaces along a road to a vehicle, the method including:
    receiving in a server a transmission from each of a plurality of vehicles of a vehicle fleet containing data regarding a parking position of each of the plurality of vehicles;
    determining in the server the parking position of each of the plurality of vehicles using the data, and determining in the server the parking position of at least one of the plurality of vehicles further using digital map data;
    determining in the server a number of roads within a given radius around the parking position for each received parking position of a vehicle of the plurality of vehicles;
    determining in the server a road from the number of roads for each vehicle of the plurality of vehicles that has the shortest distance between the parking position of the vehicle and the position of the road;
    classifying the parking position for each vehicle of the plurality of vehicles depending on the distance of the parking position of the respective vehicle from the plurality of vehicles from the given road;

determining a parking space type for each vehicle from the plurality of vehicles depending on the classified parking position as an off-road parking space or a parking space along the road;
    calculating a current capacity utilization of the parking spaces along the road; and
    providing from the server to the vehicle the current capacity utilization of the parking spaces along the road.

2. The method as claimed in claim 1, wherein the current capacity utilization is a relative capacity utilization of the parking spaces along the road.

3. The method as claimed in claim 2, wherein the number of roads includes segments of roads within a given radius around the parking position.

4. The method as claimed in claim 3, wherein the classification of the parking position for each vehicle is carried out by means of a classification algorithm; and/or
    wherein the classification algorithm classifies the parking position for each vehicle into one of two clusters; and/or
    wherein a first cluster is representative of off-road parking spaces and a second cluster of the two clusters is representative of parking spaces along the road.

5. The method as claimed in claim 4, wherein the classification algorithm uses a Gaussian mixture model;
    wherein the first cluster and the second cluster are separated using a separation point; and/or
    wherein the separation point is representative of a distance at which a separation is made between the two clusters; and/or
    wherein the separation point is an intersection of two Gaussian density distributions depending on the distance of the parking position of all vehicles of the plurality of vehicles from the respective specified road.

6. A method for providing a current capacity utilization of parking spaces along a road to a vehicle, the method including:
    receiving a parking position of a plurality of vehicles of a vehicle fleet;
    determining a number of roads within a given radius around the parking position for each received parking position of a vehicle of the plurality of vehicles;
    determining a road from the number of roads for each vehicle of the plurality of vehicles that has the shortest distance between the parking position of the vehicle and the position of the road;
    classifying the parking position for each vehicle of the plurality of vehicles depending on the distance of the parking position of the respective vehicle from the plurality of vehicles from the given road;
    determining a parking space type for each vehicle from the plurality of vehicles depending on the classified parking position as an off-road parking space or a parking space along the road;
    calculating a current capacity utilization of the parking spaces along the road; and
    providing the current capacity utilization of the parking spaces along the road to the vehicle; and
    wherein the current capacity utilization of the parking spaces along the road is provided in a navigation map to a user of the vehicle; and/or
    wherein the current capacity utilization of the parking spaces along the road is provided in a navigation map of the vehicle depending on a navigation destination of the vehicle.

7. The method as claimed in claim 1 wherein providing the current capacity utilization of the parking spaces along the road to the vehicle includes providing the current capacity utilization of the parking spaces along the road to a driver assistance system of the vehicle, and utilizing the driver assistance system to guide the vehicle to a road and/or a road segment in a partially, highly and/or fully automated manner and/or perform a parking maneuver when a free parking space along the road is detected.

8. A non-transitory computer-readable medium for providing a current capacity utilization of parking spaces along a road to a vehicle, wherein the computer-readable medium comprises instructions which, when executed on a computer, causes the computer to:

receive in a server a transmission from each of a plurality of vehicles of a vehicle fleet containing data regarding a parking position of each of the plurality of vehicles;

determine in the server the parking position of each of the plurality of vehicles using the data, and determine in the server the parking position of at least one of the plurality of vehicles further using digital map data;

determine in the server a number of roads within a given radius around the parking position for each received parking position of a vehicle of the plurality of vehicles;

determine in the server a road from the number of roads for each vehicle of the plurality of vehicles that has the shortest distance between the parking position of the vehicle and the position of the road;

classify the parking position for each vehicle of the plurality of vehicles depending on the distance of the parking position of the respective vehicle from the plurality of vehicles from the given road;

determine a parking space type for each vehicle from the plurality of vehicles depending on the classified parking position as an off-road parking space or a parking space along the road;

calculate a current capacity utilization of the parking spaces along the road; and provide from the server to the vehicle the current capacity utilization of the parking spaces along the road.

9. The non-transitory computer-readable medium as claimed in claim 8, wherein the current capacity utilization is a relative capacity utilization of the parking spaces along the road.

10. The non-transitory computer-readable medium as claimed in claim 9, wherein the number of roads includes segments of roads within a given radius around the parking position.

11. The non-transitory computer-readable medium as claimed in claim 10, wherein the classification of the parking position for each vehicle is carried out by means of a classification algorithm; and/or wherein the classification algorithm classifies the parking position for each vehicle into one of two clusters; and/or wherein a first cluster is representative of off-road parking spaces and a second cluster of the two clusters is representative of parking spaces along the road.

12. The non-transitory computer-readable medium as claimed in claim 11, wherein the classification algorithm uses a Gaussian mixture model.

13. The non-transitory computer-readable medium as claimed in claim 12, wherein the first cluster and the second cluster are separated using a separation point; and/or wherein the separation point is representative of a distance at which a separation is made between the two clusters; and/or wherein the separation point is an intersection of two Gaussian density distributions depending on the distance of the parking position of all vehicles of the plurality of vehicles from the respective specified road.

14. The non-transitory computer-readable medium as claimed in claim 13, wherein the current capacity utilization of the parking spaces along the road is provided in a navigation map to a user of the vehicle; and/or wherein the current capacity utilization of the parking spaces along the road is provided in a navigation map of the vehicle depending on a navigation destination of the vehicle.

15. A vehicle including a controller configured to perform the operations of claim 1.

16. The method as claimed in claim 1, wherein the server further determines the given radius based on either or both of an available communication bandwidth and available computing power.

17. The method as claimed in claim 1, wherein receiving the transmission from at least one vehicle of the plurality of vehicles comprises receiving in the server a last state call message from the at least one vehicle which is in the process of shutting down.

\*    \*    \*    \*    \*